No. 737,570. PATENTED SEPT. 1, 1903.
P. A. BOWEN.
LOCKING MECHANISM FOR TELESCOPING TUBING.
APPLICATION FILED JUNE 1, 1903.
NO MODEL.
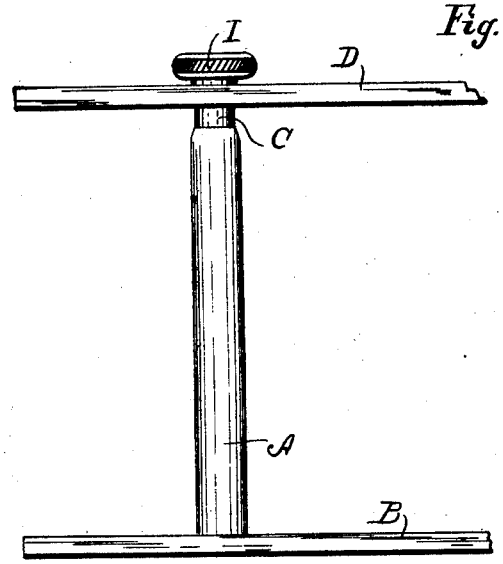
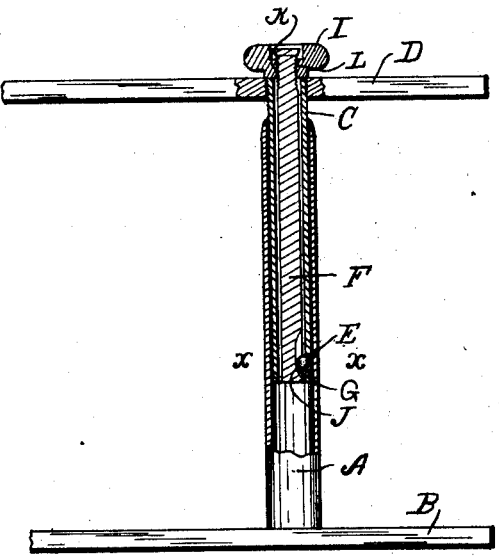
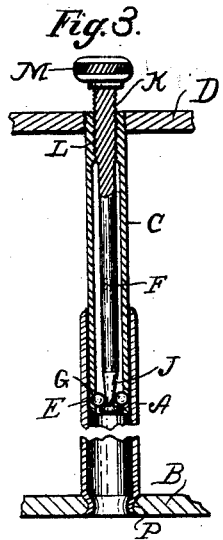
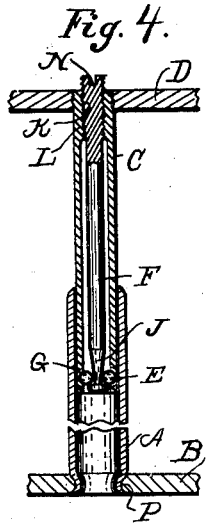
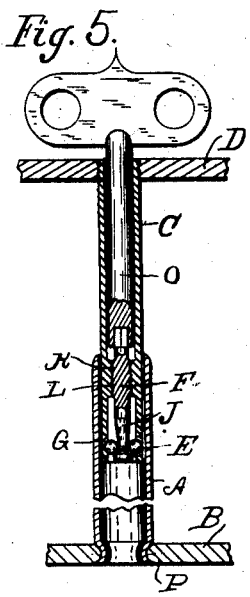
WITNESSES:
Philip A. Bowen
INVENTOR.
BY
ATTORNEYS.

No. 737,570. Patented September 1, 1903.

UNITED STATES PATENT OFFICE.

PHILIP A. BOWEN, OF MILWAUKEE, WISCONSIN, ASSIGNOR OF ONE-HALF TO ROY C. BOWEN, OF MILWAUKEE, WISCONSIN.

LOCKING MECHANISM FOR TELESCOPING TUBING.

SPECIFICATION forming part of Letters Patent No. 737,570, dated September 1, 1903.

Application filed June 1, 1903. Serial No. 159,444. (No model.)

*To all whom it may concern:*

Be it known that I, PHILIP A. BOWEN, a citizen of the United States, residing at Milwaukee, county of Milwaukee, and State of Wisconsin, have invented new and useful Improvements in Locking Mechanism for Telescoping Tubing, of which the following is a specification.

My invention relates to improvements in temporary loose-leaf binders for blank books, ledgers, periodicals, &c., and it pertains more especially to a device by which the telescoping tubes employed for connecting the respective fastening-bars of the sides or covers of the book together are locked at any desirable point of adjustment.

The construction of my device is further explained by reference to the accompanying drawings, in which—

Figure 1 represents a side view of a preferred form of my device, showing two of the telescoping tubes connected at their respective ends with the fastening-bars, one of said tubes being shown partly in longitudinal section. Fig. 2 represents a transverse section drawn on line *x x* of Fig. 1. Figs. 3, 4, and 5 represent longitudinal sections of modified forms of the mechanism for locking the tubes at the desired point of adjustment.

Like parts are identified by the same reference-letters throughout the several views.

A represents the exterior telescoping tube, which is permanently secured at one end to one of the binding-bars B.

C is the interior telescoping tube, which is rigidly affixed at one end to the opposite binding-bar D. The tubes A and C are locked at the desired point of adjustment by the joint action of the balls E and the central fastening-rod F. The balls E are interposed between the angular surfaces of the fastening-rod F and the exterior telescoping tube A. The interior tube C is provided with apertures G for the reception of said balls and through which they are forced outwardly by the longitudinal movement of said fastening-rod and are thereby caused to impinge against the exterior tube A, whereby said tubes are locked, as stated, at any desired point of adjustment.

In the preferred form the tubes are locked by moving the fastening-rod F outwardly, which end is accomplished by turning down the hand-nut I upon the protruding end of the fastening-rod F, whereby the angular or outward-diverging bearings J of said fastening-rod are drawn between the balls, and said balls are forced outwardly, as stated, through the apertures G and caused to impinge against the inner wall of the exterior telescoping tube A, thereby locking said tubes together. In the modified form shown in Figs. 3, 4, and 5 said balls E are forced outward by the inward or reverse movement of the fastening-rod F, said fastening-rod F being provided with an exterior screw-threaded bearing K, which operates in a threaded bearing L, formed upon the inner wall of the tube C. When it is desired to release the telescoping tubes of the modified form for readjustment or any other purpose, said balls are released from contact with the exterior tube by turning said fastening-rod F outwardly in its screw-threaded bearings, whereby the converging ends of the angular bearings J are brought between the fastening-balls, thereby releasing them from contact with the exterior tubes, when said tubes may be moved to any desired point of adjustment and again locked at such point by turning said fastening-rods inwardly.

In Fig. 3 the fastening-rod F is shown as being provided with a knob M, by which it is turned in either direction, as desired. In Fig. 4 such rod is provided with a recess N for the reception of a screw-driver or other instrument by which it may be turned, while in Fig. 5 the fastening-rod F is shortened and is provided with screw-threaded bearings near the center of the telescoping tube C, and the same is operated by the key or wrench O, which key or wrench is removed from the rod after the same has been adjusted.

While I have shown and preferably used three balls E for locking the telescoping tubes, it will be understood that the number of such balls may be either increased or diminished, as desired, without departing from the spirit of my invention.

To prevent the hand-nut I (shown in Fig. 1) from being accidentally disengaged from the fastening-rod F, I preferably upset or enlarge the outer end of said rod above said nut, so that the same cannot be unscrewed therefrom. While the exterior tube A may, if desired, be attached to the binding-bars B by a screw-threaded connection, I preferably secure them in place in said binding-bar, as indicated in Figs. 3, 4, and 5, by countersinking the respective sides of the apertures P preparatory to inserting the tubes A, when the ends of said tubes A are upset or forced outwardly, so as to bear firmly in the countersunk surfaces of said apertures, whereby they are securely held in place.

While I have shown and described my locking mechanism for locking telescoping tubes together in connection with a temporary loose-leaf binder, I do not wish to confine or limit my invention to its use in connection with temporary binders only, as the same is equally adapted to be used in connection with telescoping tubes for various other purposes.

Having thus described my invention, what I claim as new, and desire to secure by Letters Patent, is—

1. The combination of an interior tube provided with ball-receiving apertures an exterior overlapping or telescoping tube; a central fastening-rod located within the inner tube provided with longitudinally-diverging bearings, one or more balls interposed between said fastening-rod and said exterior telescoping tube within said apertures, and means for moving said fastening-rod longitudinally within said tubes against said balls or bearings, whereby said balls or bearings are forced outwardly through the apertures of said interior inclosing tube and caused to impinge against said exterior tube and locking said tubes together.

2. The combination of an interior tube provided with ball-receiving apertures; an exterior overlapping tube; a central fastening-rod located within said inner tube provided with longitudinal diverging bearings, one or more balls interposed between said fastening-rod and said exterior telescoping tube within said apertures; a screw-threaded hand-nut having threaded bearings on the protruding end of said fastening-rod adapted to bear against the opposing protruding end of said interior telescoping tube, whereby said fastening-rod is adapted to be adjusted longitudinally within, and in relation to its inclosing tube by turning said hand-nut on said rod, and said fastening-balls brought into or out of locking position with said exterior tube, as set forth.

3. In a temporary loose-leaf binder, the combination of an interior and an exterior telescoping tube said interior tube being provided at its inner end with ball-receiving apertures, and connected at its outer end with a metallic binding-bar, said exterior tube being rigidly affixed at one end to another opposing binding-bar; a central fastening-rod located within the inner tube and provided with longitudinal diverging bearings; a plurality of balls interposed between said fastening-rod and said exterior telescoping tube within said apertures and means for moving said fastening-rod longitudinally within said tubes against said balls or bearings, and thereby forcing said balls or bearings outwardly and against said exterior tube, substantially as set forth.

4. In a temporary loose-leaf binder, the combination of an interior and an exterior telescoping tube, said interior tube being provided at one end with ball-receiving apertures and being connected at its opposite end with a metallic binding-bar, said exterior telescoping tube being rigidly connected at one end with an opposing metallic binding-bar; a central fastening-rod located within the inner tube provided with longitudinal diverging bearings, one or more balls interposed between the longitudinal diverging bearings of said fastening-rod and said exterior telescoping tube within said apertures, said fastening-rod being provided on its protruding end with a screw-threaded hand-nut operating upon the screw-threaded bearings of said rod and against the protruding end of said interior tube, all substantially as, and for the purpose specified.

In testimony whereof I affix my signature in the presence of two witnesses.

PHILIP A. BOWEN.

Witnesses:
JAS. B. ERWIN, 
N. Z. TAUGHER.